United States Patent [19]

Chowdhury

[11] Patent Number: 5,587,676
[45] Date of Patent: Dec. 24, 1996

[54] DRIVER CIRCUIT

[75] Inventor: Vivek Chowdhury, Heston, United Kingdom

[73] Assignee: S GS - Microelectronics Limited, Buckingham, England

[21] Appl. No.: 312,877

[22] Filed: Sep. 27, 1994

[30] Foreign Application Priority Data

Oct. 1, 1993 [GB] United Kingdom ............ 9320246

[51] Int. Cl.⁶ .................................... H03K 17/26
[52] U.S. Cl. ................... 327/108; 327/333; 327/382
[58] Field of Search ........................... 327/333, 108, 327/111, 112, 198, 142, 50, 52–58, 65–68, 77, 78, 80, 81, 85, 89, 90, 382; 315/169.3, 169.4

[56] References Cited

U.S. PATENT DOCUMENTS

| | | | |
|---|---|---|---|
| 4,173,756 | 11/1979 | Kawagai et al. | 327/50 |
| 4,180,762 | 12/1979 | Weber | 315/169.4 |
| 4,591,745 | 5/1986 | Shen | 327/143 |
| 4,633,107 | 12/1986 | Norsworthy | 327/198 |
| 4,636,658 | 1/1987 | Arakawa | 327/80 |
| 4,736,117 | 4/1988 | Wieser | 307/585 |
| 4,835,417 | 5/1989 | Kousaka et al. | 327/78 |
| 4,866,349 | 9/1989 | Weber | 315/169.4 |
| 4,996,443 | 2/1991 | Tateno | 327/333 |
| 5,003,195 | 3/1991 | Stelling et al. | 327/181 |
| 5,034,624 | 7/1991 | Flaherty et al. | 327/142 |
| 5,038,055 | 8/1991 | Kinoshita | 327/58 |
| 5,068,553 | 11/1991 | Love | 327/262 |
| 5,081,380 | 1/1992 | Chen | 327/262 |
| 5,081,400 | 1/1992 | Weber et al. | 315/169.4 |
| 5,134,319 | 7/1992 | Yamaguchi | 327/52 |
| 5,146,109 | 9/1992 | Martignoni et al. | 327/108 |
| 5,302,861 | 4/1994 | Jelinek | 327/198 |
| 5,399,915 | 3/1995 | Yahata | 327/333 |

FOREIGN PATENT DOCUMENTS

| | | | |
|---|---|---|---|
| 362142415 | 6/1987 | Japan | 327/142 |
| 403179814 | 8/1991 | Japan | 327/333 |

OTHER PUBLICATIONS

S. A. Steiner, et al., "High Performance Column Driver for Gray–Scale TFEL Displays", *SID International Symposium—Digest of Technical Papers*, vol. XIX, (SID Digest, 1988) pp. 31–34. no month.

T. Yamazaki, et al., "A Liquid Crystal TV Display Panel Incorporating Drivers", *Proceedings of the SID*, vol. 23, No. 4, (1982), pp. 223–226. no month.

*Primary Examiner*—Timothy P. Callahan
*Assistant Examiner*—T. Lam
*Attorney, Agent, or Firm*—Vinson & Elkins L.L.P.

[57] ABSTRACT

A driver circuit has an input stage with an input node for receiving a control signal. A capacitor circuit is connected to the input node and a first power supply and is arranged to be charged up by said first power supply under the control of the control signal. The driver circuit also has an output stage connected to a second power supply and is arranged to provide a driver signal in dependence on the charge stored at the capacitor circuit. A buffer circuit is connected between the capacitor circuit and the output stage.

18 Claims, 2 Drawing Sheets

DRIVER CIRCUIT

FIELD OF THE INVENTION

The present invention relates to a driver circuit and particularly but not exclusively to a high voltage analogue grey scale driver circuit for driving flat panel electroluminescent displays, for example using zinc sulphide as the electroluminescent material. As is well known, such driver circuit are required to produce a potential difference across the electroluminescent material in the display to activate the display. So-called "grey scale" driver circuits are required to produce different potential differences in accordance with different control inputs so as to provide different electroluminescent outputs from the display.

BACKGROUND OF THE INVENTION

A known "grey scale" driver circuit comprises an input stage in the form of a level shifter, a capacitor circuit connected to the level shifter and operating as a sample and hold (SH) switch and an output stage in the form of a voltage follower. This circuit receives the following signals:
  i) a pulse width modulated logic signal which is supplied to the level shifter and which, when level shifted controls the sampling period of the SH switch;
  ii) a ramped analogue voltage which is sampled and held by the SH switch at a time determined by the pulse width modulated logic signal.

The signal which is held by the SH switch is transferred to an output node via the voltage follower which receives a power supply at a high voltage required to supply the necessary potential difference across the electroluminescent material, typically 60V. The high voltage power supply is normally modulated to reduce power consumption in flat panel systems and thus the voltage supplied to the voltage follower will increase and decrease in accordance with the modulation applied to it. The high voltage power supply is normally ramped but is generally out of phase with the ramped analogue voltage supplied to the SH switch. Furthermore, where the voltage follower is made with MOS transistors, these transistors must be large to carry the high voltages required for the display and, as such, have large parasitic capacitances associated therewith. These large parasitic capacitances and the variations in the modulated power supply can cause the circuit to function incorrectly because the output node can become coupled to the signal held at the SH switch through the parasitic capacitance, thereby affecting the output drive voltage from the voltage follower. Where the SH switch is implemented by a capacitor and a transistor switch, the capacitor can be caused to store not only a signal derived from the ramped analogue voltage under the control of the pulse width modulated logic signal but also a signal incorrectly derived from the modulations on the power supply to the voltage follower through the parasitic capacitances associated therewith.

In order to try and overcome this problem, it is conventional to ensure that the capacitor in the SH switch is several times larger than the parasitic capacitances of the voltage follower. However, as the parasitic capacitances of the voltage follower can be substantial, due to the large transistors required, this requires a large capacitor in the SH circuit and a consequential waste of chip area where the circuit is to be made as an integrated circuit on a semiconductor chip.

The present invention seeks to overcome this problem by providing a driver circuit which can utilise a capacitor of a smaller size.

SUMMARY OF THE INVENTION

According to the present invention there is provided a driver circuit comprising: an input stage having an input node for receiving a control signal; a capacitor circuit connected to said input node and to a first power supply and arranged to be charged up by said first power supply under the control of said control signal; and an output stage connected to a second power supply and arranged to provide a driver signal in dependence on the charge stored at said capacitor circuit, wherein a buffer circuit is connected between the capacitor circuit and the output stage.

The interposition of a buffer circuit between the output stage and the capacitor circuit provides appropriate decoupling between the output stage and the signal stored at the capacitor circuit. Thus, the capacitor circuit is no longer prone to being influenced by the effect of parasitic capacitances in the output stage.

The invention is particularly applicable where the first power supply is a ramped power supply and the capacitor circuit operates as a sample-and-hold switch to hold a signal in dependence on the control signal. Where the control signal is a pulse width modulated signal, the time on the ramp at which the signal is held is related to the pulse width.

The buffer circuit could be driven from the second power supply for the output stage. However, there is particular advantage in driving the buffer circuit from the first power supply which is supplied to the capacitor circuit. This further decouples the output stage from the capacitor circuit. This is particularly effective where the second power supply is modulated to reduce power consumption.

By providing a decoupling between the modulated power supply and the output node and the capacitor circuit, a capacitor of the capacitor circuit can be significantly reduced in size, thereby saving chip area. The buffer circuit itself need not consume a large amount of chip area as it can be constructed as a voltage follower using small MOS transistors.

The circuit of the present invention can be implemented using any MOS technology but has been particularly designed to use BCD (bipolar CMOS-DMOS) technology since this allows a cost effective solution for the output stage and further assists in preventing latch-up because of good isolation.

With the present invention it has been possible to provide twice the number of output drivers in an area of chip capable of accommodating a certain number of prior art driver circuits. This is mainly due to the use of a smaller capacitor within the circuit.

The present invention will now be described by way of example with reference to the accompanying drawings.

DESCRIPTION OF THE PREFERRED EMBODIMENT

Figure 1:
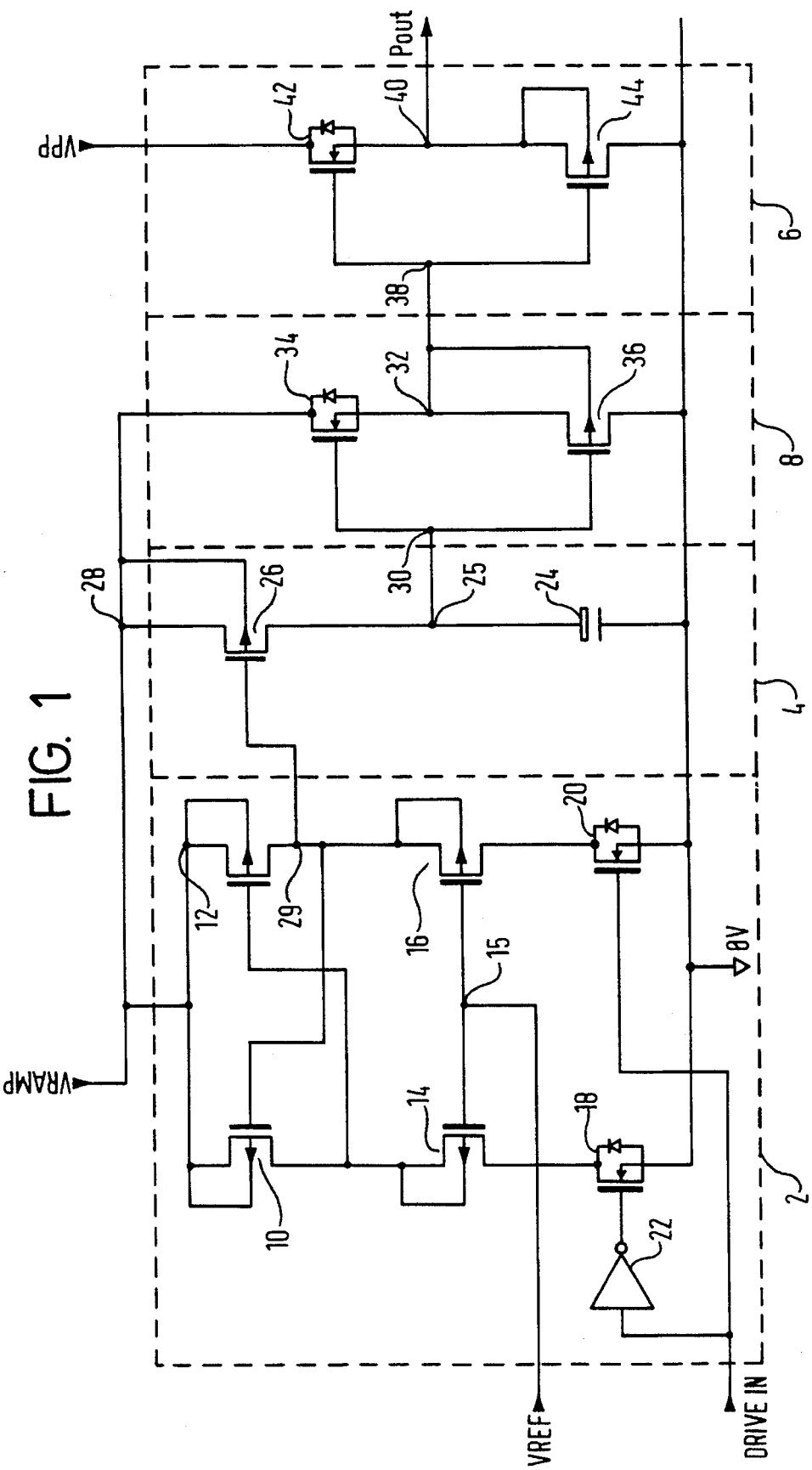
FIG. 1 is circuit diagram of a driver circuit in accordance with one embodiment of the present invention.

FIG. 1 illustrates a grey scale driver circuit comprising an input stage 2 comprising a level shift circuit, a capacitor circuit 4, an output stage 6 and, between the capacitor circuit and the output stage 6, a buffer circuit 8. The level shift circuit includes input DMOS transistors 18 and 20. The transistor 20 has its gate connected to receive a pulse width modulated logic signal DRIVE-IN and the transistor 18 has its gate connected to receive an inverted version of this signal through an inverter 22. The signal DRIVE-IN is at about 5V.

The level shift circuit also includes first and second transistors 10,12 connected in a cross-coupled arrangement and respectively connected to third and fourth transistors 14,16. The input transistors 14,16 have their gates connected to a common node 15 which receives a reference signal, Vref.

The transistors 10,12,14 and 16 are high voltage p-channel devices with the bulk silicon connected to their sources. Power to the input stage 2 is provided by a ramped analogue voltage VRAMP which varies up to about 60V. This voltage VRAMP is also supplied to the capacitor circuit 4 which comprises a capacitor 24 and a transistor 26 connected between the capacitor 24 and a node 28 connected to receive the ramped analogue voltage VRAMP. The capacitor 24 and transistor 26 cooperate to act as a sample and hold switch. The transistor 26 receives at its gate the level-shifted signal from the input stage 2 on node 29. Reference numeral 25 denotes the node between the transistor 26 and capacitor 24 where the sampled voltage is held.

The buffer circuit 8 is also connected to receive as its power supply the ramped analogue voltage VRAMP and has an input node 30 connected to node 25 to receive the voltage signal stored on the capacitor 24. It has an output node 32 which feeds the output stage 6. The buffer circuit has a first DMOS transistor 34 and a second CMOS transistor 36 connected as a voltage follower. These transistors are relatively small and in fact are of a size comparable with the transistors used in the input stage and for the sample and hold switch. Typical sizes of these transistors are a width of 13.5 microns and length of 4.5 microns.

The output node 32 of the buffer circuit 8 is connected to an input node 38 of the output stage 6. The output stage 6 has an output node 40 which supplies the grey scale voltage POUT to drive a flat panel display. The output stage 6 comprises a DMOS transistor 42 which can be 12 times the size of the transistors 18,20 and 34 and a CMOS transistor 44 which is substantially larger than the other CMOS transistors and can for example have a width of 430 um and a length of 4.5 um. The transistors 42,44 are connected as a voltage follower. The large sizes are necessary in order to supply the large voltages required to drive a flat panel display.

The output stage 6 receives a voltage supply Vpp which is at a high voltage, for example 60V and which is modulated to cut down on power consumption. Thus, it is driven so that it is turned fully on only when drive is actually required from the output stage 6.

Figure 2:
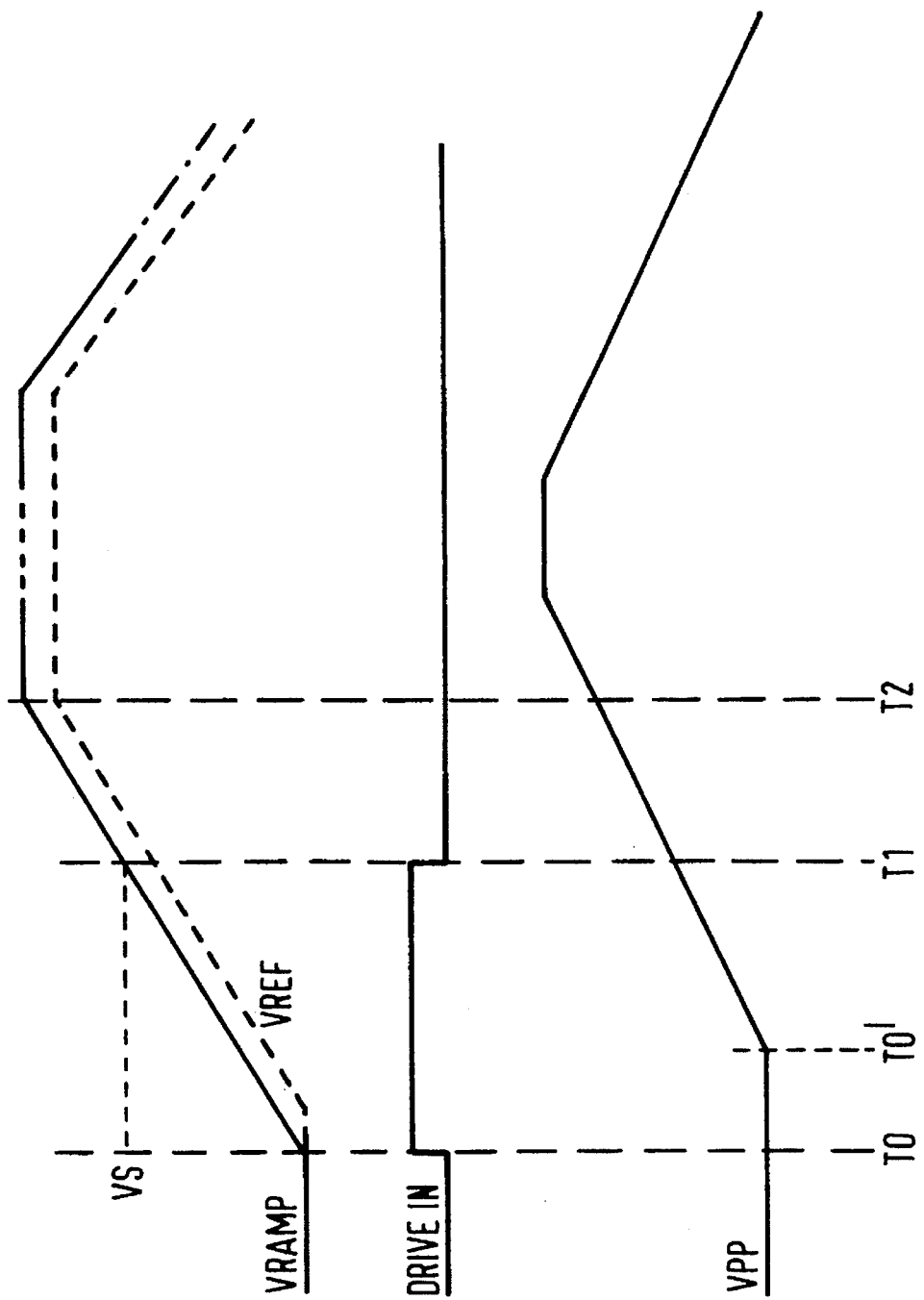
FIG. 2 is a timing diagram.

Reference will now be made to FIG. 2 to describe the operation of the circuit. FIG. 2 illustrates the wave forms for the first power supply VRAMP, the control signal (in the form of a pulse width modulated logic signal) DRIVE-IN, the second power supply Vpp and the reference voltage for the level shift circuit Vref. These timing diagrams exemplify one way in which the circuit can be operated. Other relative timings are possible to operate the circuit.

At time T0, the first power supply VRAMP starts to increase from 0 V. At the same time, the leading edge of a pulse on the pulse width modulated logic signal DRIVE-IN enters the input stage 2. It is level shifted and output at node 29 to open the transistor switch 26. Thus, the capacitor 24 is being charged while the voltage VRAMP is increasing up until the end of the pulse, time at T1, when the transistor switch 26 is turned off by the end of the pulse. The voltage VS is thus held on the capacitor 24. The voltage VRAMP continues to increase until time T2 when it is at its maximum level of about 60V, but no further charge is stored on the capacitor 24 during the period T1 to T2. The voltage VRAMP remains at 60V for a predetermined time period and then starts to decrease in a ramped fashion.

The pulse width modulated logic signal DRIVE-IN is level shifted by the level shift circuit of the input stage 2 to bring it to a level closer to the power supplies. Thus, the reference voltage VREF ramps up with the voltage VRAMP but maintained at a predetermined voltage difference from it. This voltage difference is related to the voltage difference which can be sustained across the transistors 10,12,14,16 in the level shift circuit. This is illustrated by the dotted line VREF in FIG. 2.

The second power supply Vpp begins to increase in a ramped fashion at a time T0' somewhat later than T0. This increases to its maximum level of about 60V and stays there for a predetermined time which is less than the time for which the voltage VRAMP stays at its maximum level. When the second power supply Vpp is at its maximum level, the signal held at the node 25 is transferred through the buffer circuit 32 and via the output stage 40 to form the output signal POUT. This forms the driver signal for a flat panel display system or the like. The second power supply Vpp then starts to decrease in a ramped fashion.

Only one cycle of operation is shown in FIG. 2 but it will be readily apparent that such a sequence occurs on a cyclic basis.

What is claimed is:

1. A driver circuit comprising:
    an input stage having an input node for receiving a control signal;
    a capacitor circuit connected to said input stage and a first power supply and arranged to be charged up by said first power supply under the control of said control signal;
    an output stage connected to a second power supply and arranged to provide a driver signal in dependence on the charge stored at said capacitor circuit, wherein a buffer circuit is connected between the capacitor circuit and the output stage; and
    wherein the first and second power supplies are ramped power supplies with respectively different timings.

2. A driver circuit according to claim 1, wherein the buffer circuit is connected to the first power supply.

3. A driver circuit according to claim 1, wherein the capacitor circuit comprises a capacitor and a switch connected between the capacitor and the first power supply and arranged to be actuated by the control signal to operate as a sample-and-hold switch.

4. A driver circuit according to claim 1, wherein the control signal is a pulse width modulated signal and wherein the first power supply is sampled at a time dependent on the pulse width.

5. A driver circuit according to claim 1, wherein the first and second power supplies are at a voltage level substantially higher than said control signal and wherein the input stage comprises a level shift circuit.

6. A driver circuit according to claim 5, wherein the control signal is at about 5V and the first and second power supplies vary up to about 60V.

7. A driver circuit according to claim 1, wherein the buffer circuit comprises first and second MOS transistors connected in a voltage follower configuration.

8. A driver circuit according to claim 7, wherein the output stage comprises first and second MOS transistors connected in a voltage follower configuration.

9. A driver circuit according to claim 8, wherein the transistors of the output stage are substantially larger than the transistors in the buffer circuit.

10. A driver circuit according to claim 8, wherein the transistors in the buffer circuit and the output stage are BCD transistors.

11. A driver circuit comprising:

an input stage having an input node for receiving a control signal;

a capacitor circuit connected to said input stage and a first power supply and arranged to be charged up by said first power supply under the control of said control signal;

an output stage connected to a second power supply and arranged to provide a driver signal in dependence on the charge stored at said capacitor circuit, wherein a buffer circuit is connected between the capacitor circuit and the output stage; and wherein the first and second power supplies are ramped power supplies an are at a voltage level substantially higher than said control signal.

12. The driver circuit of claim 11, wherein the first and second power supplies vary up to a voltage level at least ten times higher than said control signal.

13. The driver circuit of claim 12, wherein the first and second power supplies vary up to a voltage level of about 60 Volts and the control signal is about 5 Volts.

14. An analog driver circuit comprising:

an input stage comprising an input node for receiving a control signal;

a capacitor circuit connected to said input stage and to a first power supply, wherein said capacitor circuit is charged by said first power supply in response to said control signal;

an output stage connected to a second high voltage power supply, comprising at least one large transistor which creates large parasitic capacitances, or providing a driver signal proportional to the charge stored at said capacitor circuit; and a buffer circuit connected between the capacitor circuit and the output stage, wherein said buffer circuit decouples the output stage and the signal at the capacitor circuit to prevent interference of the capacitor circuit from parasitic capacitances of the output stage wherein said first power supply and said second high voltage power supply are ramped power supplies with respectively different timings.

15. The driver circuit of claim 11, wherein said capacitor circuit comprises a capacitor and a switch connected between the capacitor and the first power supply.

16. The driver circuit of claim 12, wherein the buffer circuit is powered by said first power supply and has an input node connected to receive a voltage signal stored on the capacitor of the capacitor circuit, such that the capacitor may be significantly smaller due to a lack of influence from the parasitic capacitances of the output stage on the voltage signal stored on the capacitor.

17. A driver circuit, comprising:

an input stage having an input node for receiving a control signal;

a capacitor circuit connected to said input stage and a first power supply and arranged to be charged up by said first power supply under the control of said control signal; and an output stage connected to a second power supply and arranged to provide a driver signal in dependence on the charge stored at said capacitor circuit, wherein a buffer circuit comprising first and second MOS transistors connected in a voltage follower configuration is connected between the capacitor circuit and the output stage; and wherein the first and second power supplies are ramped power supplies with respectively different timings.

18. A driver circuit, comprising:

an input stage having an input node for receiving a control signal;

a capacitor circuit connected to said input stage and a first power supply and arranged to be charged up by said first power supply under the control of said control signal;

an output stage, comprising first and second MOS transistors connected in a voltage follower configuration, connected to a second power supply and arranged to provide a driver signal in dependence on the charge stored at said capacitor circuit, wherein a buffer circuit is connected between the capacitor circuit and the output stage; and wherein the first and second power supplies are ramped power supplies with respectively different timings.

* * * * *

UNITED STATES PATENT AND TRADEMARK OFFICE
CERTIFICATE OF CORRECTION

PATENT NO. : 5,587,676
DATED : December 24, 1996
INVENTOR(S) : Vivek Chowdhury

It is certified that error appears in the above-indentified patent and that said Letters Patent is hereby corrected as shown below:

ON THE TITLE PAGE:

In Item [73] Assignee:, delete "SGS-Microelectronics Limited", insert --SGS-Thomson Microelectronics Limited--.

Col. 5, ln. 27, delete "an", insert --and--.

Col. 5, ln. 44, delete "or", insert --for--.

Signed and Sealed this

Twenty-eighth Day of October, 1997

*Attest:*

BRUCE LEHMAN

*Attesting Officer*   *Commissioner of Patents and Trademarks*